United States Patent
Nijhawan

(10) Patent No.: US 12,447,439 B2
(45) Date of Patent: Oct. 21, 2025

(54) DRY SORBENT INJECTION WITH RECIRCULATION

(71) Applicant: Industrial Accessories Company, Overland Park, KS (US)

(72) Inventor: Pramodh Nijhawan, Knoxville, TN (US)

(73) Assignee: Industrial Accessories Company, Overland Park, KS (US)

(*) Notice: Subject to any disclaimer, the term of this patent is extended or adjusted under 35 U.S.C. 154(b) by 491 days.

(21) Appl. No.: 17/990,187

(22) Filed: Nov. 18, 2022

(65) Prior Publication Data
US 2023/0158449 A1    May 25, 2023

Related U.S. Application Data

(60) Provisional application No. 63/281,196, filed on Nov. 19, 2021.

(51) Int. Cl.
*B01D 53/50* (2006.01)
*B01D 53/78* (2006.01)
(Continued)

(52) U.S. Cl.
CPC ......... *B01D 53/508* (2013.01); *B01D 53/502* (2013.01); *B01D 53/78* (2013.01);
(Continued)

(58) Field of Classification Search
CPC .... B01D 53/502; B01D 53/508; B01D 53/78; B01D 53/81; B01D 53/96; B01D 2251/304; B01D 2251/604; B01D 2251/606; B01D 2257/302; B01D 2258/0283; B01J 20/043; C01F 11/46; C01F 11/464
See application file for complete search history.

(56) References Cited

U.S. PATENT DOCUMENTS

| 3,107,142 A | 10/1963 | Schoeffel et al. |
| 3,505,008 A | 4/1970 | Frevel et al. |

(Continued)

FOREIGN PATENT DOCUMENTS

| CN | 112850745 A | * 5/2021 | ............ C01C 1/164 |
| WO | 2020169760 | 8/2020 | |

OTHER PUBLICATIONS

Machine translation of Wu et al (CN 112850745) (Year: 2021).*
(Continued)

*Primary Examiner* — Brian A McCaig
(74) *Attorney, Agent, or Firm* — Hovey Williams LLP

(57) ABSTRACT

Described herein is a dry sorbent injection system and process for removing sulfur oxides from a flue gas. The process generally comprises treating the flue gas with a dry sorbent material to convert the sulfur oxides to sodium sulfate particulates. The sodium sulfate particulates may then be introduced into a mix tank with water to form sodium sulfate solution. The sodium sulfate solution may then be reacted with a calcium hydroxide slurry to produce a reaction mixture comprising calcium sulfate precipitate and a sodium hydroxide solution. The calcium sulfate (gypsum) may be recovered, and the sodium hydroxide solution may be recirculated to pre-treat the flue gas by removing at least a portion of the sulfur dioxide and/or cooling the flue gas stream.

18 Claims, 2 Drawing Sheets

(51) Int. Cl.
  *B01D 53/81* (2006.01)
  *B01J 20/04* (2006.01)
  *C01F 11/46* (2006.01)
(52) U.S. Cl.
  CPC ............ *B01D 53/81* (2013.01); *B01J 20/043* (2013.01); *C01F 11/464* (2013.01); *B01D 2251/304* (2013.01); *B01D 2251/604* (2013.01); *B01D 2251/606* (2013.01); *B01D 2257/302* (2013.01)

(56) References Cited

U.S. PATENT DOCUMENTS

| | | | |
|---|---|---|---|
| 3,989,797 | A | 11/1976 | Brady et al. |
| 4,239,737 | A | 12/1980 | Ermini |
| 4,385,039 | A | 5/1983 | Lowell et al. |
| 4,542,000 | A | 9/1985 | Alexander et al. |
| 4,588,569 | A | 5/1986 | Cyran et al. |
| 4,783,325 | A | 11/1988 | Jones |
| 4,795,619 | A | 1/1989 | Lerner |
| 4,956,162 | A | 9/1990 | Smith et al. |
| 5,002,741 | A | 3/1991 | Hooper |
| 5,096,680 | A | 3/1992 | Lindbauer et al. |
| 6,143,263 | A | 11/2000 | Johnson et al. |
| 6,214,308 | B1 | 4/2001 | Keener et al. |
| 7,854,911 | B2 | 12/2010 | Maziuk, Jr. et al. |
| 8,695,516 | B2 | 4/2014 | Nijhawan |
| 9,174,165 | B1 | 11/2015 | Dube |
| 9,593,023 | B2 | 3/2017 | Vandendoren |
| 10,343,111 | B2 | 7/2019 | Byers et al. |
| 2011/0014106 | A1 | 1/2011 | Pfeffer et al. |
| 2011/0303133 | A1 | 12/2011 | Nijhawan |
| 2014/0205521 | A1 | 7/2014 | Neumann et al. |
| 2016/0290637 | A1 | 10/2016 | Noman et al. |
| 2017/0120188 | A1 | 5/2017 | Thijssen |
| 2019/0015778 | A1 | 1/2019 | Sindram et al. |

OTHER PUBLICATIONS

Wu, et al., "A model for dry sodium bicarbonate duct injection flue gas desulfurization", Advances in Environmental Research, 2004, 8(3-4), pp. 655-666 (abstract attached).

Dal Pozzo, et al., "Experimental Investigation of the Reactivity of Sodium Bicarbonate toward Hydrogen Chloride and Sulfur Dioxide at Low Temperatures", Ind. Eng. Chem. Res. 2019, 58, 16, pp. 6316-6324.

Keener, et al., "Kinetics of the sodium bicarbonate-sulfur dioxide reaction", Chemical Engineering Science, 1993, 48(16), pp. 2859-2865 (abstract attached).

Walawska, et al., "Flue Gas Desulfurization by Mechanically and Thermally Activated Sodium Bicarbonate", Polish Journal of Chemical Technology, 2014, 16(3), pp. 56-62.

Pilat, et al., "Pilot Scale SO2 Control by Dry Sodium Bicarbonate Injection and an Electrostatic Precipitator", Environmental Progress, 2007, 26(3), pp. 263-270.

Prada, et al., "Flue Gas Desulfurization Assessment by Modeling and Experimental Work of an Optimized Fixed-Bed NaHCO3 Reactor", Ind. Eng. Chem. Res. 2019, 58, 40, pp. 18717-18730 (abstract attached).

Erdos, et al., "Application of the Active Soda Process for Removing Sulphur Dioxide from Flue Gases", JAPCA, 1989, 39, pp. 1206-1209.

Keener, et al., "Study of the Reaction of S02 with NaHCO3 and Na2CO3", JAPCA, 1984, 34, pp. 651-654.

Zach, et al., "The Influence of SO2 and HCl Concentrations on the Consumption of Sodium Bicarbonate during Flue Gas Treatment", Energy Fuels, 2021, 35(6), pp. 5064-5073 (abstract attached).

Zarebska, et al., "Purification of flue gases from combustion of solid fuels with sodium sorbents (Oczyszczanie gazw ze spalania paliw staych z SO2 sorbentami sodowymi)", Przemysl Chemiczny, 2015, 94(3), pp. 382-386 (abstract attached).

\* cited by examiner

DRY SORBENT INJECTION WITH RECIRCULATION

CROSS-REFERENCE TO RELATED APPLICATIONS

The present application claims the priority benefit of U.S. Provisional Patent Application Ser. No. 63/281,196, filed Nov. 19, 2021, entitled DRY SORBENT INJECTION WITH RECIRCULATION, incorporated by reference in its entirety herein.

BACKGROUND OF THE INVENTION

Field of the Invention

The present invention is generally directed to dry sorbent injection systems and processes for removing sulfur oxides from a flue gas.

Description of Related Art

Dry sorbent injection (DSI) systems and processes are traditionally used to remove sulfur oxides and/or other pollutants from flue gas streams before releasing the flue gas to the environment. However, existing systems and processes can be inefficient and produce excess waste or by-products. What is needed is a DSI system and process that provides more efficient sulfur oxide removal and/or recovers by-products for recirculation or off-site use and sale.

SUMMARY OF THE INVENTION

In one embodiment, there is provided a process for removing sulfur oxides from a flue gas. The process comprises treating the flue gas with a dry sorbent material that reacts with at least a portion of the sulfur oxides to produce sodium sulfate particulates; introducing the sodium sulfate particulates and water into a mix tank, and dissolving the sodium sulfate particulates in the water to form a sodium sulfate solution; and introducing the sodium sulfate solution and a calcium hydroxide slurry into a reaction tank, and reacting at least a portion of the sodium sulfate solution with at least a portion of the calcium hydroxide slurry to produce a reaction mixture comprising a calcium sulfate precipitate and a sodium hydroxide solution.

In one embodiment, there is provided a process for removing sulfur dioxide from a thermal oxidizer flue gas. The process comprises treating the flue gas with a dry sorbent material to recover sodium sulfate; reacting at least a portion of the sodium sulfate and a calcium hydroxide slurry to produce a reaction mixture comprising a solids portion comprising precipitated calcium sulfate and a liquids portion comprising sodium hydroxide solution; and recovering the solids portion as a gypsum product, wherein the gypsum product comprises at least 99% by weight calcium sulfate.

In one embodiment, there is provided a process for removing sulfur dioxide from a flue gas. The process comprises treating the flue gas with a dry sorbent material to recover sodium sulfate; reacting at least a portion of the sodium sulfate and a calcium hydroxide slurry to produce a reaction mixture comprising calcium sulfate precipitate and a sodium hydroxide solution; and pre-treating the flue gas with at least a portion of the sodium hydroxide solution to remove at least a portion of the sulfur dioxide from the flue gas before treating the flue gas with the dry sorbent material.

DETAILED DESCRIPTION

Figure 1:
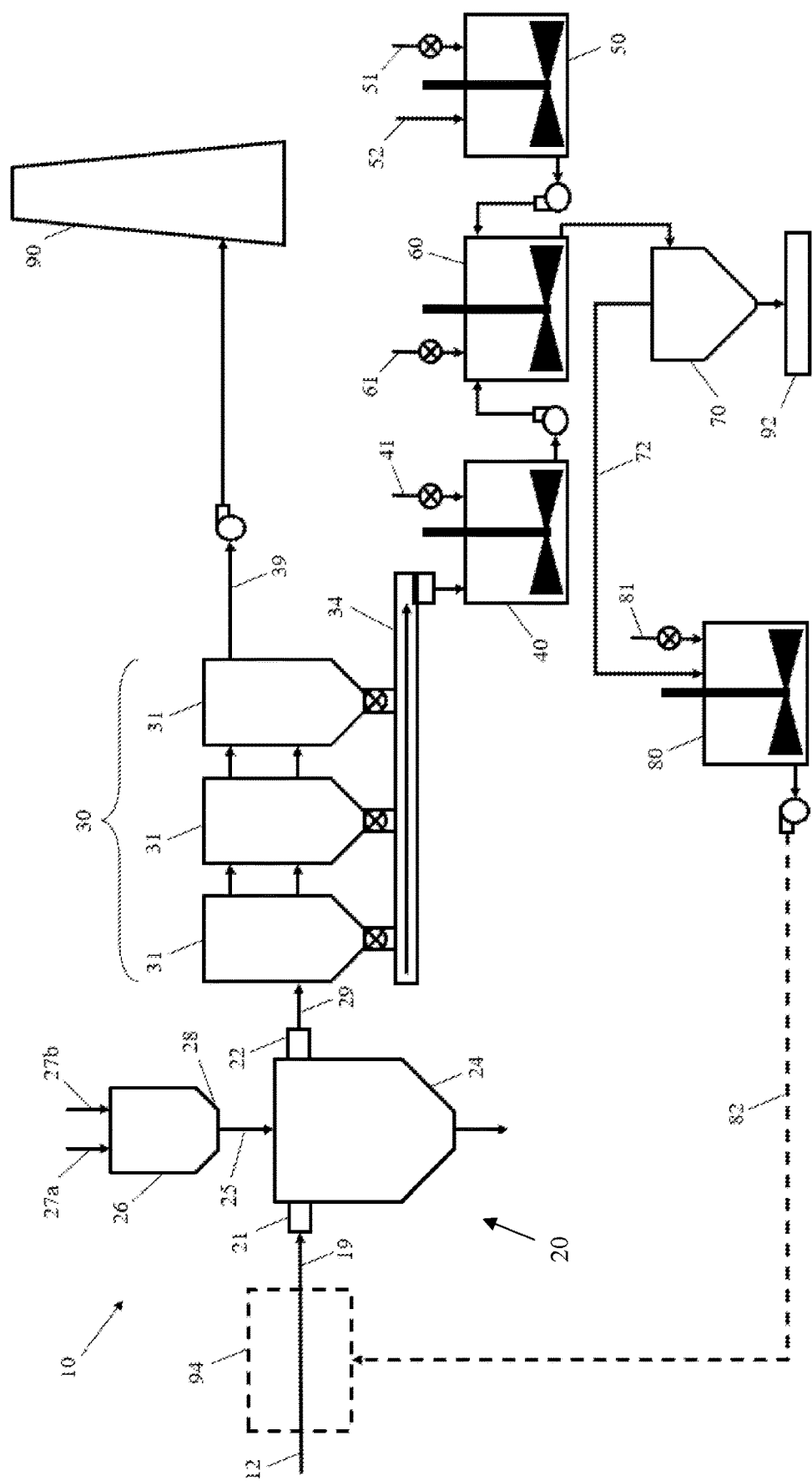
FIG. 1 is a process flow diagram showing a dry sorbent injection process in accordance with one embodiment of the present invention.

The present invention is generally directed to dry sorbent injection systems and processes for removing sulfur oxides from a flue gas. FIG. 1 shows an exemplary dry sorbent injection (DSI) system and process 10. The embodiment shown in FIG. 1 includes various preferred and optional features of the DSI system and process 10. However, it should be understood that these features may be included, or certain features may be omitted, in accordance with embodiments of the present invention. Additionally, other processes and equipment not shown or described herein may also be included as necessary or desired.

The system 10 generally comprises a dry sorbent material mix box 20, one or more particulate matter collection systems 30, a first mix tank 40 for dissolving at least a portion of the particulate matter, a second mix tank 50 for producing a calcium hydroxide (lime) slurry, a reaction tank 60 for combining and reacting the dissolved particulate matter and calcium hydroxide slurry, a solids-liquids separation device 70 for separating the solid and liquid components from the reaction tank, and a dilution tank 80 for preparing a sodium hydroxide solution that may be recirculated upstream of the mix box 20 for pre-treatment of the inlet flue gas stream and/or recycled to other processes in this or other systems.

Referring to FIG. 1, the DSI process begins with an inlet flue gas stream 12 comprising entrained pollutants, which must be at least partially neutralized and/or removed before being released to the environment. For example, the flue gas stream 12 may comprise one or more pollutants, such as sulfur oxides ($SO_x$), nitrogen oxides ($NO_x$), hydrochloric acid (HCl), heavy metals (e.g., Hg, As, Pb, Se, Ca), and/or carbon monoxide (CO). In certain embodiments, the flue gas stream comprises a waste gas from a thermal oxidizer (e.g., regenerative thermal oxidizer). Thermal oxidizers are generally used to remove hazardous air pollutants (HAPs) and volatile organic compounds (VOCs) from industrial air streams. The hydrocarbon-based pollutants are thermally combusted, and thus chemically oxidized to form $CO_2$ and $H_2O$. Thermal combustion of the pollutants typically requires relatively high temperatures (e.g., about 500° C. to about 1200° C.), and thus the waste gas from the thermal oxidizer generally has a temperature of at least about 500° C., at least about 600° C., at least about 700° C., at least about 800° C., at least about 900° C., or at least about 1000° C. In certain embodiments, the flue gas stream has a temperature about 500° C. to about 1200° C., about 700° C. to about 1100° C., or about 900° C. to about 1000° C. However, the downstream processes for removal of sulfur oxides generally require much lower processing temperatures. Thus, the waste gas for the thermal oxidizer may be cooled such that the inlet flue gas has a temperature of about 100° C. to about 300° C., about 150° C. to about 250° C., or about 175° C. to about 225° C.

In certain embodiments, the flue gas is not derived from a coal combustion power plant or other combustion process (e.g., incineration, etc.) that produces fly ash. Thus, in certain embodiments, the flue gas stream is substantially free of fly ash. In certain embodiments, the flue gas stream comprises less than 1000 ppmw, less than 500 ppmw, less than 100 ppmw, less than 50 ppmw, less than 10 ppmw, or less than 1 ppmw of fly ash.

In certain embodiments, the flue gas stream is substantially free of halogens, such as chlorides (e.g., HCl). In certain embodiments, the flue gas stream comprises less than 1000 ppmw, less than 500 ppmw, less than 100 ppmw, less than 50 ppmw, less than 10 ppmw, or less than 1 ppmw of halogens, chlorides, and/or HCl.

The inlet flue gas stream 12 may be optionally pre-treated, for example, to lower the temperature of flue gas steam and/or to react and remove at least a portion of the sulfur oxides present in the inlet flue gas stream 12. Referring again to FIG. 1, inlet flue gas stream 12 may be fed into an optional recirculation zone 94, wherein a sodium hydroxide (NaOH) solution may be injected into the flue gas stream. In certain embodiments, the sodium hydroxide solution may be derived from one or more downstream processes, as described in greater detail below. Upon injection into the flue gas stream 12, the sodium hydroxide solution may provide at least a portion of the necessary cooling to the flue gas stream, thereby lowering the temperature for further processing. For example, in certain embodiments, the inlet flue gas stream 12 fed to the recirculation zone 94 may have an initial temperature of at least about 500° C., and pre-treatment with the sodium hydroxide solution may cool the flue gas temperature to about 100° C. to about 300° C., about 150° C. to about 250° C., or about 175° C. to about 225° C. Additionally, or alternatively, the sodium hydroxide may react with at least a portion of the sulfur oxides to produce sodium sulfate, sodium bisulfate, sodium sulfite, and/or sodium bisulfite particulates, according to one or more of the following reactions:

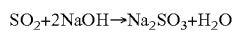
$SO_2 + 2NaOH \rightarrow Na_2SO_3 + H_2O$

$SO_2 + NaOH \rightarrow NaHSO_3$

$4\ SO_2 + 8NaOH \rightarrow 4H_2O + 3Na_2SO_4 + Na_2S$

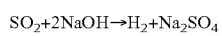
$SO_2 + 2NaOH \rightarrow H_2 + Na_2SO_4$

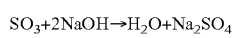
$SO_3 + 2NaOH \rightarrow H_2O + Na_2SO_4$

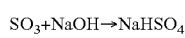
$SO_3 + NaOH \rightarrow NaHSO_4$

Any particulates formed during the pre-treatment may be collected and removed from the flue gas stream or may be carried with the flue gas stream 19 to downstream processes as described herein.

The inlet flue gas stream 12 (or pre-treated flue gas stream 19) may be further cooled, for example in a heat exchanger (not shown), to an appropriate processing temperature (as described above) and fed into mix box 20 comprising a quantity of dry sorbent material. Additionally, or alternatively, the inlet flue gas 12 may be cooled in a heat exchanger (not shown) before being pre-treated in the recirculation zone 94.

Within the mix box 20, the flue gas contacts dry sorbent material that resides in the mix box 20 or is concurrently introduced into mix box 20 along with the flue gas stream 19. The dry sorbent material may be any of a variety of materials capable of reacting with and/or otherwise removing pollutants in the flue gas stream. In certain embodiments, the dry sorbent material is capable of reacting with and/or removing sulfur oxides and/or other acid gasses from the flue gas stream. In certain embodiments, the dry sorbent material comprises an alkaline sorbent material selected from the group consisting of sodium bicarbonate (NaHCO$_3$), sodium carbonate (Na$_2$SO$_3$), trona (Na$_2$CO$_3$·NaHCO$_3$·2H$_2$O), and mixtures thereof. Upon contact with the flue gas, the dry sorbent material may react with at least a portion of the sulfur oxides in the flue gas to produce sodium sulfate particulates, according to one or more of the following reactions:

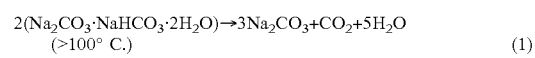
$2(Na_2CO_3 \cdot NaHCO_3 \cdot 2H_2O) \rightarrow 3Na_2CO_3 + CO_2 + 5H_2O$
$(>100° C.)$                         (1)

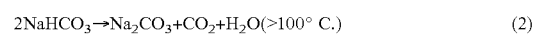
$2NaHCO_3 \rightarrow Na_2CO_3 + CO_2 + H_2O (>100° C.)$    (2)

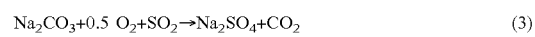
$Na_2CO_3 + 0.5\ O_2 + SO_2 \rightarrow Na_2SO_4 + CO_2$    (3)

$Na_2CO_3 + SO_2 \rightarrow Na_2SO_3 + CO_2$    (3a)

$Na_2SO_3 + 0.5\ O_2 \rightarrow Na_2SO_4$    (3b)

$Na_2CO_3 + SO_3 \rightarrow Na_2SO_4 + CO_2$    (4)

The mix box 20 advantageously provides a reaction vessel to ensure a sufficient reaction of the sorbent material and sulfur oxides, thereby increasing the removal of sulfur oxides from the flue gas stream and conversion to sodium sulfate, as compared to traditional duct injection systems. In certain embodiments, to ensure sufficient reaction of the sorbent material and sulfur oxides in the mix box, the flue gas stream may have a residence time in the mix box of at least about 0.5 seconds, or at least about 1 second. In certain embodiments, the flue gas stream may have a residence time in the mix box of about 0.5 seconds to about 5 second, or about 1 second to about 2 seconds.

As shown in FIG. 1, in certain embodiments, mix box 20 may comprise a hopper configuration having a flue gas inlet 21 and flue gas outlet 22. At least a portion of any particulate materials (e.g., unreacted sorbent material, partially reacted sorbent material, and/or converted sodium sulfate particulates) may be collected in the hopper portion 24 and removed from the flue gas stream or may be carried with the flue gas stream to downstream processes as described herein. Any unused or partially used sorbent material may be recycled for further use in the mix box 20.

In certain embodiments, a sorbent feeder device 26 may be positioned above mix box 20 and may be configured to deposit dry sorbent material 25 into an upper opening (not shown) of mix box 20 to contact the flue gas flowing therethrough. The feeder device 26 may comprise one or more inlets 27a for introducing fresh dry sorbent material and/or one or more inlets 27b for introducing recycled sorbent material to the feeder device 26. The feeder device may further comprise an opening or chute 28 configured to direct the fresh and/or recycled sorbent material 25 into the mix box 20.

The flue gas stream 29 exiting the mix box 20 is generally depleted in sulfur oxides and enriched in carbon dioxide relative to the flue gas stream 19 entering the mix box 20. However, the flue gas stream 29 exiting the mix box 20 will generally comprise a quantity of particulate materials entrained therein, such as unreacted sorbent material (e.g., sodium bicarbonate, trona), partially reacted sorbent material (e.g., sodium carbonate), and/or converted sodium sulfate particles.

The flue gas stream 29 comprising entrained particulate matter may then be fed into one or more particulate matter collection systems 30. As shown in FIG. 1, in certain embodiments, the one or more particulate matter collection systems may comprise a baghouse, which may comprise a plurality of bag filters 31, which effectively collect and remove the entrained particulate matter from the flue gas stream flowing therethrough. The removed particulate matter may generally comprise sodium carbonate and/or converted sodium sulfate particles, although unreacted sorbent material and other solids may also be collected and removed. The removed particulate manner may be directed out of the collection system(s) 30 to downstream processing via conveyor 34, which may be a belt conveyor, screw conveyor, pneumatic conveyor, or other conveyance system.

The flue gas stream 39 exiting the particulate matter collection system(s) 30 is generally depleted in particulate matter relative to the flue gas stream 29 entering the collection system(s) 30. In particular, the flue gas stream 39 exiting the particulate matter collection system(s) 30 is generally depleted in sodium sulfate and/or sodium carbonate relative to the flue gas stream 29 entering the collection system(s) 30. The flue gas stream 39 exiting the particulate matter collection system(s) 30 may then be pumped or otherwise directed to the flue gas stack 90 to be released to the environment.

As shown in FIG. 1, in certain embodiments, at least a portion of the particulate matter collected and removed in the collection system(s) 30 may be introduced into a mix tank 40 along with a quantity of water 41. Upon mixing in the mix tank 40, the sodium sulfate, the sodium carbonate, and/or other solids in the collected particulate matter is substantially or completely dissolved to form an aqueous solution. In certain embodiments, the quantity of water 41 is introduced at a rate such that the aqueous solution in the mix tank 40 has a total dissolved solids concentration of about 20% by weight or less. By maintaining a total dissolved solids concentration of about 20% or less, the solids may be inhibited from precipitating out of solution. In certain embodiments, the quantity of water 41 is introduced at a rate such that the aqueous solution in the mix tank 40 has a total dissolved solids concentration of at least about 1%, at least about 5%, at least about 10%, or at least about 15% by weight and/or not more than about 20% by weight.

The aqueous solution comprising dissolved sodium sulfate, dissolved sodium carbonate, and/or other solids may then be pumped, or otherwise introduced into a reaction tank 60. In the reaction tank 60, the aqueous solution is mixed with a calcium hydroxide slurry. As shown in FIG. 1, the calcium hydroxide slurry may be prepared by introducing dry calcium hydroxide 52 and water 51 into a slurry tank 50, where they are mixed to form the calcium hydroxide slurry. In certain embodiments, the water is introduced into the slurry tank at a rate such that the slurry has a solids concentration of about 20% by weight or less. In certain embodiments, when the aqueous solution and slurry are mixed in the reaction tank 60, water 61 may be introduced to the reaction tank 60 such that the reaction mixture has a solids concentration of about 15% by weight or less. In certain embodiments, when the aqueous solution and slurry are mixed in the reaction tank 60, water 61 may be introduced to the reaction tank 60 such that the reaction mixture has a solids concentration of at least about 1%, at least about 5%, or at least about 10% by weight and/or not more than about 15% by weight.

In the reaction tank 60, calcium hydroxide reacts with sodium sulfate and/or sodium carbonate to produce a sodium hydroxide solution comprising calcium sulfate and/or calcium carbonate precipitated out as solids. In particular, calcium hydroxide reacts with sodium sulfate and/or sodium carbonate to produce calcium sulfate and/or calcium carbonate in an aqueous sodium hydroxide solution, according to one or more of the following reactions:

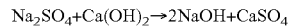

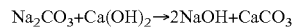

The reaction solution may then be fed to a solid-liquid separation system 70, wherein the precipitated solids in the sodium hydroxide solution may be separated from the solution, and optionally recovered for further use or sale. In certain embodiments, the solid-liquid separation system 70 comprises a hydrocyclone separation system. In certain embodiments, the solids recovered from the solid-liquid separation system may be further separated (not shown) to isolate specific solid components, such as calcium sulfate. However, in certain embodiments, such additional separation is not necessary or included. The recovered solids, and particularly the recovered calcium sulfate, may be further processed, for example in a filter press 92, to remove at least a portion of any remaining liquid content from the recovered solids. Thus, in certain embodiments, calcium sulfate (gypsum) can be recovered having a liquid content of less than about 5% by weight.

The calcium sulfate (gypsum) recovered according to certain embodiments of the present invention can be advantageously produced with sufficient purity to be sold and used in other industries, such as various construction materials. In particular, since in certain embodiments the flue gas is substantially free of fly ash, the recovered calcium sulfate may also be substantially free of fly ash contamination. In certain embodiments, the recovered gypsum material comprises at least 99%, preferably at least 99.9% by weight calcium sulfate.

The liquid effluent stream 72 from the solid-liquid separation system 70 comprising the sodium hydroxide solution may be discharged or further processed. In certain embodiments, at least a portion of the sodium hydroxide solution may be reacted with carbon dioxide, for example by introducing the solution to the carbon dioxide enriched flue gas stream or other carbon dioxide-containing stream, to produce sodium carbonate, which can be recycled or sold separately. Additionally, or alternatively, in certain embodiments, the sodium hydroxide solution may be fed to an optional recirculation zone 94 to pre-treat the flue gas stream 12, as described above. As shown in FIG. 1, the sodium hydroxide solution effluent stream 72 may be directed from the solid-liquid separation system 70 to a dilution tank 80, where water 81 may be added to dilute the solution. In certain embodiments, the sodium hydroxide solution is diluted to a concentration of about 20% by weight or less. In certain embodiments, the sodium hydroxide solution is diluted to a concentration of at least about 1%, at least about 5%, at least about 10%, or at least about 15% by weight and/or not more than about 20% by weight. The diluted sodium hydroxide stream 82 may be fed to the recirculation zone 94 for use in flue gas pre-treatment as described above.

Figures 2A, 2B:
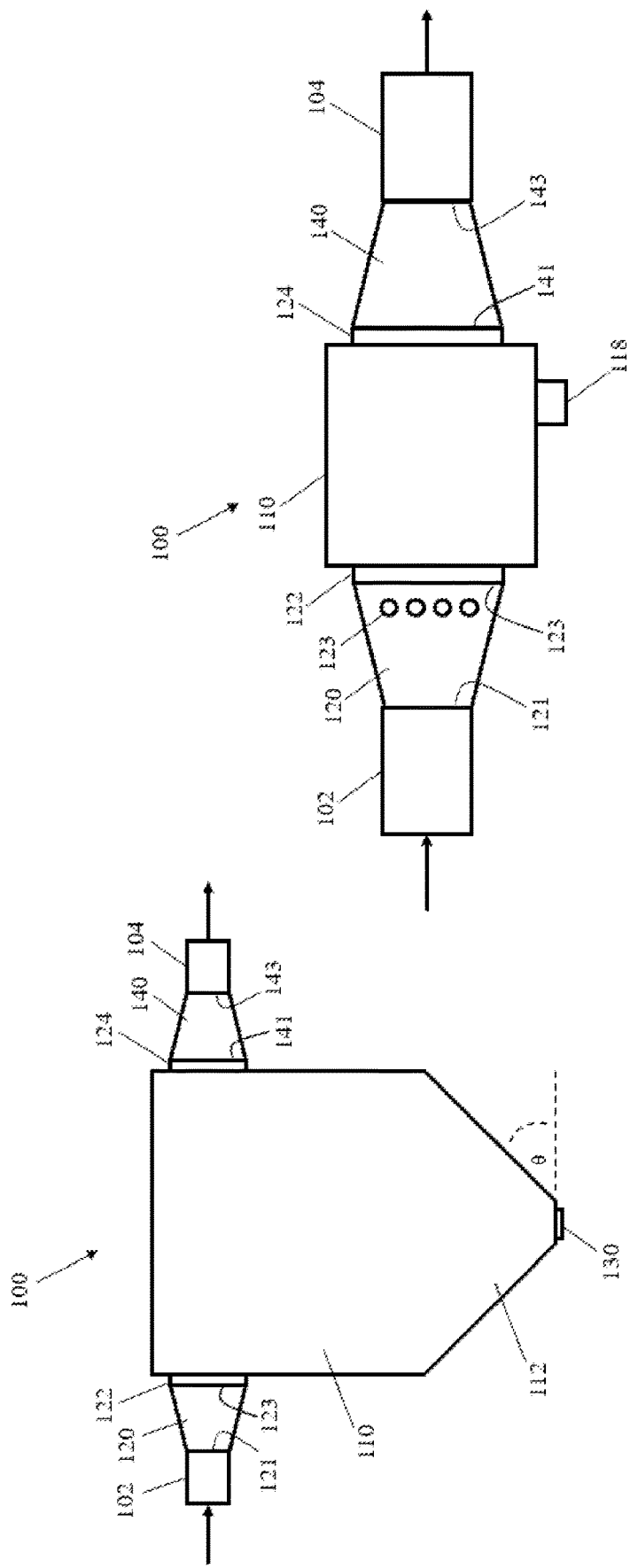
FIG. 2A and FIG. 2B are schematic drawings of a mix box according to one embodiment of the present invention.

FIG. 2A and FIG. 2B depict an exemplary mix box 100, in accordance with embodiments of the present invention, and its associated components and operation are described herein. The gas stream to be treated (e.g., flue gas) flows through duct 102 into inlet cap 120. Inlet cap 120 comprises a gas receiving side 121 adapted to be installed onto the duct 102 and a mix box feed side 123 adapted to be installed on the inlet 122 of mix box 100. In certain embodiments, feed side 123 may have a cross-sectional area smaller than the cross-sectional area of the receiving side 121, and thus the velocity of the gas stream flowing through inlet cap 120 may be reduced before the gas is introduced into the chamber of mix box 100. In certain embodiments, receiving side 121 may have cross-sectional area of about 1 ft$^2$ to about 10 ft$^2$, or about 2 ft$^2$ to about 5 ft$^2$. In certain embodiments, feed side 126 may have a cross-sectional area of about 2 ft$^2$ to about 20 ft$^2$, or about 5 ft$^2$ to about 10 ft$^2$. In certain embodiments, the ratio of the cross-sectional area of the feed side 123 to the cross-sectional area of the receiving side 121 is about 1.5:1 to about 3:1, or about 2:1 to about 2.5:1.

As best shown in FIG. 2B, inlet cap 120 may comprise one or more openings 123 (e.g., lances) formed in a top or upper surface of inlet cap 120, through which fresh and/or recycled sorbent material may be introduced, for example, from a sorbent feeder device (not shown). The sorbent introduced through openings 123 will become at least partially entrained within the gas stream and will thus be introduced into the mix box 100 along with the flowing gas. In certain embodiments, openings 123 may be generally circular and have an inner diameter of about 1 inch to about 10 inches, or about 2 inches to about 5 inches.

The gas stream and entrained sorbent material flow from inlet cap 120 into mix box 100, which generally comprises an upper portion 110 and a lower hopper portion 112. In certain embodiments, the volume of mix box 100 (including bother upper portion 110 and lower portion 112) is about 200 ft$^3$ to about 500 ft$^3$, or about 300 ft$^3$ to about 400 ft$^3$.

Upper portion 110 generally comprises inlet 122 formed therein, through which the gas stream and entrained sorbent material is introduced to mix box 100, and an outlet 124, through which the treated gas (and a residual entrained sorbent material) exits mix box 100. In certain embodiments, the gas stream may have a residence time in mix box 100 of about 0.5 seconds to about 5 second, or about 1 second to about 2 seconds. In certain embodiments, the upper portion 110 has a height of about 5 ft to about 20 ft, or about 8 ft to about 12 ft. In certain embodiments, the upper portion 110 has a length and/or width of about 40 inches to about 100 inches, or about 60 inches to about 80 inches.

Lower hopper portion 112 generally comprises one or more sloped walls configured to direct the spent sorbent material through a bottom opening of lower portion 112. Any unused or partially used sorbent material may be collected from the bottom opening and recycled for further use, for example, by introducing the recycled material into an opening 123 of inlet cap 120. In certain embodiments, release of the sorbent material through the bottom opening may be controlled by a knife gate 130 installed at the bottom opening. In certain embodiments, the lower portion 112 has a height of about 5 ft to about 20 ft, or about 8 ft to about 12 ft. In certain embodiments, the one or more sloped walls have an angle (θ) of about 50° to about 70° relative to the surface upon which the mix box 120 resides.

The gas stream exiting mix box 100 via outlet 124 may be directed through outlet cap 140. Outlet cap 140 comprises a treated gas receiving side 141 and a gas outlet side 143. Gas outlet side 143 is adapted to connect to, and to direct the gas stream into, downstream duct 104.

In certain embodiments, receiving side 141 may have a cross-sectional area larger than the cross-sectional area of the outlet side 143, and thus the velocity of the gas stream flowing through inlet cap 120 may be increased before the gas is introduced into duct 104. In certain embodiments, outlet side 143 may have cross-sectional area of about 1 ft$^2$ to about 10 ft$^2$, or about 2 ft$^2$ to about 5 ft$^2$. In certain embodiments, receiving side 141 may have a cross-sectional area of about 2 ft$^2$ to about 20 ft$^2$, or about 5 ft$^2$ to about 10 ft$^2$. In certain embodiments, the ratio of the cross-sectional area of the receiving side 141 to the cross-sectional area of the outlet side 143 is about 1.5:1 to about 3:1, or about 2:1 to about 2.5:1.

In certain embodiments, mix box 100 further comprises a damper 118 installed within a side wall of upper portion 110, which may be used to bleed air from or into mix box 100. In certain embodiments, damper 118 may comprise a conduit having a cross-sectional area of about 1 ft$^2$ to about 10 ft$^2$, or about 2 ft$^2$ to about 5 ft$^2$. In certain embodiments, damper 118 comprises a louver configured to inhibit the external environment (e.g., rain, light, etc.) from entering mix box 100.

In certain embodiments, the flue gas rate through mix box 100 is about 5,000 to about 30,000 actual cubic feet per minute (ACFM), or about 10,000 to about 20,000 ACFM. The systems and processes described herein have a number of advantages over existing dry sorbent injection applications. For example, downstream reactions of particulate matter collected from the dry sorbent process allows for the production of product quality gypsum, which may be sold or used in other industries. Additionally, recovery of sodium hydroxide solution allows for recirculation and pre-treatment of the inlet flue gas, which increases sulfur oxide removal and improves efficiency by at least partially cooling the flue gas stream before the dry sorbent is injected.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

The invention claimed is:
1. A process for removing sulfur oxides from a flue gas, the process comprising:
    treating the flue gas with a dry sorbent material that reacts with at least a portion of the sulfur oxides to produce sodium sulfate particulates;

introducing the sodium sulfate particulates and water into a mix tank, and dissolving the sodium sulfate particulates in the water to form a sodium sulfate solution;

introducing the sodium sulfate solution and a calcium hydroxide slurry into a reaction tank, and reacting at least a portion of the sodium sulfate solution with at least a portion of the calcium hydroxide slurry to produce a reaction mixture comprising a calcium sulfate precipitate and a sodium hydroxide solution; and pre-treating at least a portion of the flue gas with at least a portion of the sodium hydroxide solution to remove at least a portion of the sulfur dioxide from the flue gas before treating the flue gas with the dry sorbent material.

2. The process of claim 1, wherein the flue gas is substantially free of fly ash.

3. The process of claim 1, wherein the calcium hydroxide slurry is formed by introducing calcium hydroxide particulates and a second source of water into a second mix tank.

4. The process of claim 1, wherein the calcium hydroxide slurry in the second mix tank has a total solids concentration of about 20% by weight or less.

5. The process of claim 1, wherein:
(i) the sodium sulfate solution in the mix tank has a total dissolved solids concentration of about 20% by weight or less; and/or
(ii) the reaction mixture has a total solids concentration of about 15% by weight or less.

6. The process of claim 1, wherein the flue gas has a temperature of about 100° C. to about 300° C. before treating with the dry sorbent material.

7. The process of claim 1, further comprising recovering at least a portion of the calcium sulfate precipitate to produce a gypsum product having a calcium sulfate concentration of at least 99% by weight.

8. A process for removing sulfur dioxide from a thermal oxidizer flue gas, the process comprising:
treating the flue gas with a dry sorbent material to recover sodium sulfate;
reacting at least a portion of the sodium sulfate and a calcium hydroxide slurry to produce a reaction mixture comprising a solids portion comprising precipitated calcium sulfate and a liquids portion comprising sodium hydroxide solution;
recovering the solids portion as a gypsum product, wherein the gypsum product comprises at least 99% by weight calcium sulfate; and
pre-treating at least a portion of the flue gas with at least a portion of the sodium hydroxide solution to remove at least a portion of the sulfur dioxide from the flue gas before treating the flue gas with the dry sorbent material.

9. The process of claim 8, wherein the flue gas is substantially free of fly ash.

10. The process of claim 8, wherein the calcium hydroxide slurry is formed by introducing calcium hydroxide particulates and a source of water into a mix tank.

11. The process of claim 8, wherein the flue gas has a temperature of about 100° C. to about 300° C. before treating with the dry sorbent material.

12. The process of claim 8, wherein recovering the solids portion comprises removing liquid from the solids portion such that the gypsum product has a liquids content of less than about 5% by weight.

13. A process for removing sulfur dioxide from a flue gas, the process comprising:
treating the flue gas with a dry sorbent material to recover sodium sulfate;
reacting at least a portion of the sodium sulfate and a calcium hydroxide slurry to produce a reaction mixture comprising calcium sulfate precipitate and a sodium hydroxide solution; and
pre-treating the flue gas with at least a portion of the sodium hydroxide solution to remove at least a portion of the sulfur dioxide from the flue gas before treating the flue gas with the dry sorbent material.

14. The process of claim 13, wherein the flue gas is substantially free of fly ash.

15. The process of claim 13, wherein the calcium hydroxide slurry is formed by introducing calcium hydroxide particulates and a source of water into a mix tank.

16. The process of claim 13, wherein the flue gas has a temperature of about 100° C. to about 300° C. before treating with the dry sorbent material.

17. The process of claim 13, further comprising recovering at least a portion of the calcium sulfate precipitate to produce a gypsum product having a calcium sulfate concentration of at least 99% by weight.

18. The process of claim 13, further comprising diluting the sodium hydroxide solution with water to provide a diluted stream comprising about 20% by weight or less of sodium hydroxide before pre-treating the flue gas stream.

* * * * *